(12) United States Patent
Propst, Jr.

(10) Patent No.: US 7,833,915 B2
(45) Date of Patent: Nov. 16, 2010

(54) GREASE, OIL AND WAX RESISTANT PAPER COMPOSITION

(75) Inventor: Charles W. Propst, Jr., Gettysburg, PA (US)

(73) Assignee: Spectra-Kote Corporation, Gettysburg, PA (US)

( * ) Notice: Subject to any disclaimer, the term of this patent is extended or adjusted under 35 U.S.C. 154(b) by 968 days.

(21) Appl. No.: 10/481,320

(22) PCT Filed: Jun. 29, 2001

(86) PCT No.: PCT/US01/20882

§ 371 (c)(1),
(2), (4) Date: Feb. 10, 2004

(87) PCT Pub. No.: WO03/002342

PCT Pub. Date: Jan. 9, 2003

(65) Prior Publication Data

US 2004/0185286 A1  Sep. 23, 2004

(51) Int. Cl.
*B32B 27/12* (2006.01)
*B32B 27/04* (2006.01)

(52) U.S. Cl. .............. 442/80; 442/91; 442/93; 442/152; 442/153; 428/34.2; 428/35.6; 162/135; 162/137; 162/157.6; 162/158; 106/157.2; 106/157.71; 106/157.8

(58) Field of Classification Search ............. 442/80, 442/91, 93, 152, 153; 428/34.2, 35.6; 162/135, 162/137, 157.6, 158; 106/157.2, 157.71, 106/157.8
See application file for complete search history.

(56) References Cited

U.S. PATENT DOCUMENTS

| | | | | |
|---|---|---|---|---|
| 3,413,190 | A | * | 11/1968 | Aycock et al. .............. 162/175 |
| 4,272,569 | A | | 6/1981 | Shaw et al. |
| 4,489,112 | A | | 12/1984 | Wise et al. |
| 4,537,815 | A | | 8/1985 | Wise et al. |
| 4,641,159 | A | | 2/1987 | Seitz et al. |
| 5,330,622 | A | | 7/1994 | Honnorat et al. |
| 5,393,566 | A | | 2/1995 | Propst |
| 5,674,961 | A | | 10/1997 | Fitzgerald |
| 5,776,619 | A | * | 7/1998 | Shanton ..................... 428/511 |
| 5,858,173 | A | | 1/1999 | Propst, Jr. |
| 5,876,815 | A | | 3/1999 | Sandstrom et al. |
| 5,882,396 | A | | 3/1999 | Hiorns |
| 5,985,367 | A | | 11/1999 | Nishijima et al. |
| 6,066,375 | A | | 5/2000 | Shanton |
| 6,379,497 | B1 | * | 4/2002 | Sandstrom et al. ......... 162/123 |
| 6,740,373 | B1 | * | 5/2004 | Swoboda et al. ........... 428/34.2 |

OTHER PUBLICATIONS

International Search Report.
Specific Technical Questions (Test Methods).
Environmental Protection Agency (EPA) 40 CFR Part 721 OPPTS-50639; FRL-6745-5 RIN 2070-AD43; Perfluorooctyl Sulfonates; Proposed Significant New Use Rule.

* cited by examiner

*Primary Examiner*—Ula C Ruddock
(74) *Attorney, Agent, or Firm*—Novak Druce & Quigg LLP

(57) ABSTRACT

In order to provide grease, oil and wax resistance to a paper substrate, a coating containing a binder, a filler material and calcium carbonate is used. The coating of the invention is essentially free from fluorocarbons, which are considered harmful to human and animal populations, and surfactants and other chemicals which may alter the color of the coated paper. The coated paper has a GE brightness level between approximately 50 and approximately 90, while providing superior grease, oil and wax resistance.

28 Claims, 2 Drawing Sheets

GREASE, OIL AND WAX RESISTANT PAPER COMPOSITION

This application is a §371 Application of International Application No. PCT/US01/020882, filed on Jun. 29, 2001, the entire disclosure of which is incorporated herein by reference in its entirety.

BACKGROUND OF THE INVENTION

1. Field of the Invention

The present invention relates to the art of cellulosic substrate coatings. Specifically, the coating of the invention is particularly selected to provide grease, oil and wax resistance to paper substrates without the deleterious inclusion of fluorocarbons, while maintaining other desired properties.

2. Discussion of the Prior Art

Water based mineral coatings for paper substrates can consist of virgin or recycled fiber, or blends of both for substrates for all types of paper packaging applications or markets. The use of minerals suspended in water for application onto paper, paperboard, bagstock, ticket stock, or linerboard, bleached or natural kraft is well known in the art. Generally, the known paper coatings include a clay (or other filler to impart color), a polymeric binder, and a fluorocarbon or wax to provide the desired grease resistance.

These coatings have been particularly developed to additionally provide industry desired brightness. Specifically, industry requires minimum GE brightness (approximately 50) to a maximum GE brightness (approximately 90). GE brightness is defined by Technical Association of the Pulp and Paper Industry (TAPPI) as a directional brightness measurement wherein the surface to be tested is illuminated with essentially parallel light beams at a 45° angle, and is described in TAPPI T 452 "Brightness of Pulp, Paper, and Paperboard (Directional Reflectance at 457 nm)."

Additionally, the selected coating must withstand the stresses which often occur during processing of the coated paper. In particular, flexibility of the coating for forming containers and packages without flaking or fracturing is required. Smoothness is necessary for high quality graphics printing, as well as a high degree of bonding to the paper surface, as measured by the wax-pick test method, is necessary. Moreover, the ability to resist the converting rigors of heat, abrasion, and pressure while passing through equipment for die cutting, scoring, printing, gluing, strapping, resisting like environments for the corrugating converting process, glueability with hot melt adhesives or cold set adhesives, and excellent fiber tear test results must be provided.

U.S. Pat. No. 5,674,961 to Fitzgerald, discloses a typical oil, water and solvent resistant paper. Specifically, a fluorocarbon is impregnated into a paper, cardboard, paperboard or cardboard substrate to impart resistance. Additionally, a synthetic base is rendered resistant by impregnating with a fluoronated component, as described in U.S. Pat. No. 5,330,622 to Honnotat et al. The inclusion of such fluorocarbons is recognized across the industry as a useful and economic method to add oil, water and solvent resistivity to paper and other fibrous products.

However, it has recently been recognized by the U.S. Environmental Protection Agency (EPA), as well as the Canadian Department of Health and Welfare, and the German BGVV, that such fluorocarbons may have deleterious health consequences. As reported by the EPA, certain fluorocarbons (e.g. perflourooctanesulfonic acid, its derivates and salts) have been found in the systems of humans and other animals, resulting in raised concerns regarding potential developmental, reproductive and systemic toxicity. It has been proposed by the EPA that the manufacture and/or release of such chemicals cease to limit build-up in both animal populations and the environment to avert adverse consequences therein.

The desire to generate a superior grease, oil, and wax resistance mineral white coatings for food and machinery packing has been a focal point of marketing display packages that remain attractive graphically by resisting stains from external and internal sources. Being economically formulated is also an industry requirement. Complying with regulations of the EPA, Canadian Health and Welfare, German BGVV, and addressing all domestic and international compliances to permit distribution internationally is without issue. The coating should also be repulpable at mills throughout the world. The presence of wax or wax containing coatings presents a problem in repulping recycled paperboard or box materials.

Therefore, there exists a need in the art to provide a coating which gives resistance to grease, oil and wax which is also environmentally palpable. Essentially, this requires the development of a coating which is free of fluorocarbons and other volatile organic component (VOC) emissions, while maintaining a degree of repulpability and the ability to be applied during the manufacture of the paper itself or during an off-line coating process.

SUMMARY OF THE INVENTION

The present invention pertains to a grease, oil and wax resistant coating composition for paper, paperboard, boxes, bagstock, ticket stock, liner board, bleached or natural kraft, cardboard and other cellulosic materials, including (1) a filler material; (2) a binder and (3) calcium carbonate. Specifically, the composition of the invention is essentially free from harmful chemicals such as fluorocarbons and surfactants which are known to hinder the desired resistance.

While the use of binders such as latex, PVC, acrylates, maleic acids proteins and filler materials, such as clay, titanium oxide, talc, sodium hexameta-phosphate and calcium carbonate, are commonly used in coatings of this type, it is the particular exclusion of fluorocarbons which forms the basis of the invention.

In order to provide the requisite level of brightness and resistivity to the final coated product, it has been found that eliminating most surfactants has been effective. Additionally, providing the calcium carbonate with a micron size between 0.6 and 7.5 µm has been shown to be effective. This can optionally be accomplished with a mechanical deeagglomerator. Finally, the coating of the invention is a formulation that permits high solids (approximately 75%) to low solids formulas (approximately 30%).

The coating of the invention is particularly designed to be used with a wide variety of paper products such as paper, paperboard, bagstock, ticket stock, or linerboard, bleached or natural kraft, in addition to cardboard or other box making materials. In a first embodiment, the coating is applied to individual fibers before dewatering and forming the paper structure. In a second embodiment, the coating is applied to a previously formed paper structure such as an elongated length of paper unwound from a roll into which the paper is formed following formation thereof.

Additional objects, features and advantages of the present invention will become more fully apparent from the following detailed description of preferred embodiments, when taken in conjunction with the drawings wherein like reference numerals refer to corresponding parts in the several views.

DETAILED DESCRIPTION OF THE PREFERRED EMBODIMENTS

Figure 1:
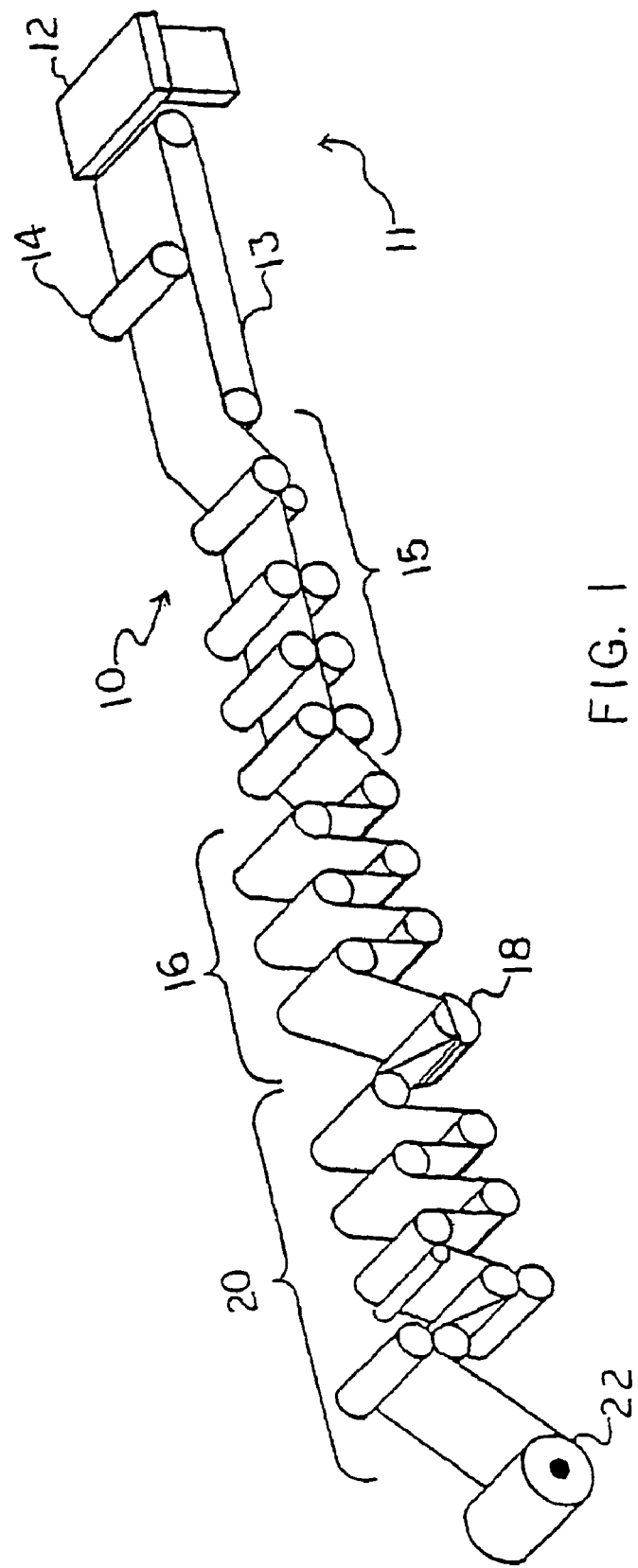
FIG. 1 is a perspective view of a first embodiment used in applying the coating of the invention.

The coating of the invention is particularly selected to impart resistance to wax, oil and grease to cellulosic substrates. Essentially, the coating includes a filler material to provide coloring and other properties, a binder and calcium carbonate, while being essentially free from surfactants and fluorocarbons.

The substrate may be any cellulosic product and cellulose containing product. While the coating is particularly designed to be used to provide resistance to paper, paperboard, bagstock, ticketstock, linerboard, natural or bleached kaft or other processed paper products, it considered within the scope of this invention to add the coating to other cellulosic products, such as clothing (either 100% cotton or a cotton-containing blend), wallpaper or laminated wood products. As such, the coating of the invention can be used in a variety of environments and situations to produce resistant qualities.

The binder is basically a polymeric binder used to hold the remaining materials to the substrate. While binders such as latex, PVC, PVA, acrylates, maleic acid, proteins, and combinations thereof, are preferred, any polymeric binder system which adheres to the surface of the substrate and holds the filler materials is sufficient.

A wide variety of filler materials may be used in the coating of the invention. While talc, clay (alumina/silica), titanium dioxide, sodium hexameta-phosphate and mixtures thereof are preferred materials, any known filler material may be used.

In order to provide the grease, wax and oil resistance, calcium carbonate is added to the coating. While it is known to provide calcium carbonate in coatings of this type, the calcium carbonate used in this invention must have certain properties. The calcium carbonate must be essentially free from surfactants. Surfactants present in greater than 1.5% can cause unwanted properties, such as a loss of color and brightness. By essentially eliminating chemicals such as stearic acid, sodium polyacrylate and other wetting agents and chemicals which permit absorption of grease, oil or hot wax into the calcium carbonate mineral surface the color and brightness can be maintained.

Finally, the coating is essentially free from fluorocarbons. As discussed above, fluorocarbons have been found in the systems of animals including humans, leading to questions as to their safety. As a result, the coating of the invention contains little or no fluorocarbon compounds. Preferably, fluorocarbon compounds are present in an amount less than approximately 0.002% by weight.

The calcium carbonate used in the coating is to be of a small size. It is preferred that the calcium carbonate particles be produced by grinding, more preferably wet grinding, down to a particle size between approximately 0.6 and approximately 7.5 µm. It is important that the surfactant content be limited during the grinding process. Following grinding, the calcium carbonate particles can be spray dried or flash dried, preceded by mechanical deagglomerator processing.

The invention will be further understood by reference to the following non-limiting examples.

Coating formulations with calcium carbonate produced as described above were fabricated, as follows:

Example A

| | |
|---|---|
| 111.0 g | $H_2O$ |
| 2.0 g | Sodium hexameta phosphate |
| 35.0 g | Titanium dioxide (rutile, dry) |
| 222.0 g | Calcium carbonate (dry, as described) |
| 40.0 g | Protein (dissolved in $H_2O$, 25% solids) |
| 120.0 g | Styrene-Butadiene-Rubber (SBR) latex (50% solids) |

Example B

| | |
|---|---|
| 111.0 g | $H_2O$ |
| 2.0 g | Sodium hexameta phosphate |
| 00.0 g | Titanium dioxide (rutile, dry) |
| 255.0 g | Calcium carbonate (dry, as described) |
| 40.0 g | Protein (dissolved in $H_2O$, 25% solids) |
| 120.0 g | SBR latex (50% solids) |

Example C

| | |
|---|---|
| 111.0 g | $H_2O$ |
| 2.0 g | Sodium hexameta phosphate |
| 155.0 g | Titanium dioxide (rutile, dry) |
| 100.0 g | Calcium carbonate (dry, as described) |
| 40.0 g | Protein (dissolved in $H_2O$, 25% solids) |
| 120.0 g | SBR latex (50% solids) |

The composition of the above described examples are particularly selected to exhibit different GE brightness spectra as required throughout the industry. Specifically, the coating of Example A produces a middle range of GE brightness, i.e. approximately 65—approximately 78, while Example B addresses a lower range, i.e. GE brightness between approximately 50 and approximately 65, and Example C addresses a middle range, i.e. GE brightness between approximately 78 and approximately 90. Each of the above formulations includes superior resistance to grease, oil and wax, as will be discussed below.

The coated paper composition of the invention may be preferably produced in one of two methods. In a first method, detailed in U.S. Pat. No. 5,858,173 to Propst, Jr., hereby incorporated by reference in its entirety, a coating is added to a substrate in the form of individual fibers. With reference to FIG. 1, individual fibers, which may be virgin, recycled or a mixture thereof, are coated with the coating of the invention before being processed in a typical paper making machine 10, including a "wet end" 11, a headbox 12, a wire 13 and a press section 15, a drying section 16, a size press 18, a calendar section 20 and a parent reel 22. A dandy roll 14 is positioned about two thirds of the way down wire 13 to level the fibers and make the sheet more uniform. Gravity and suction boxes (not shown) are positioned underneath wire 13 to remove any water from the coating solution. It is at headbox 12 that the fibers are mixed with the coating of the invention to form the coated fibers.

Figure 2:
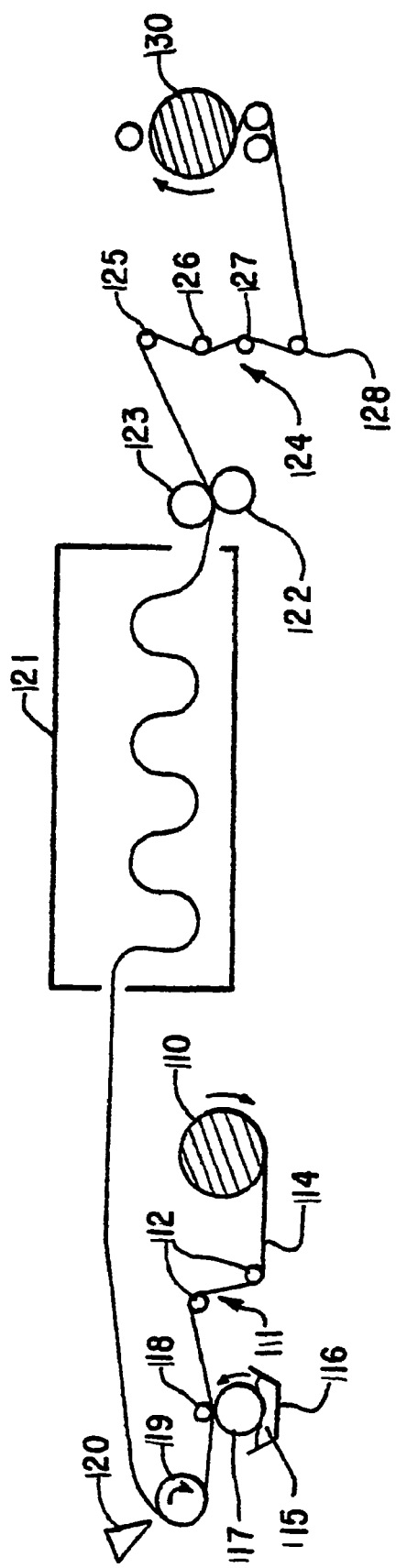
FIG. 2 is a side view of a second embodiment used to apply the coating of the invention.

In a second embodiment of the invention, description detailed in U.S. Pat. No. 5,393,566, hereby incorporated by reference in its entirety, a coating is applied after the paper structure has been formed. With reference to FIG. 2, a roll stock 110, including uncoated paper product, is mounted on an unwinding stand (not shown) and allowed to turn freely to feed the paper or (hereinafter referred to as "sheet 114") from roll stock 110 through a section 111 of free turning and power assisted rolls, only two of which are generally illustrated by reference numeral 112. It is understood that other numbers of and arrangement of rolls 112 in section 111 may be utilized, as the section 111 does not constitute an inventive feature, per se.

The coating material 115 of the invention is maintained within pan 116. The level of coating material 115 is controlled within pan 116 so as to apply a predetermined amount of coating (not shown) to roller 117. Roller 117 rotates in the direction of the arrow to transfer a predetermined amount of coating thereon (not shown) to the finished or good side of sheet 114. The nip between roller 118 and roller 117 causes the predetermined amount of coating to be transferred to sheet 14 in an amount in excess of that desired in the finished coated paper or kraft material.

Sheet 114, bearing the coating on its good or finished side is transferred about roll 119 so as to bring the coating into proximity to a directed jet of fluid, preferably a gas, most preferably air, so as to meter and remove the unwanted amounts of coating from sheet 114. The directed jet of fluid may emanate from a device such as an AIRKNIFE (John Waldron Corporation, New Brunswick, N.J.) or any similar device 120 capable of directing a high speed flow of fluid over the surface of sheet 114 carrying excess coating thereon, in order to meter or remove unwanted coating therefrom. Such devices include rod coaters, blade coaters, flexographic presses, and rotogravures.

The metered and coated sheet 114 is then fed to any suitable device for effecting solidification of the coating, such as drying unit 121. Drying unit 121 can be provided with continuous conveying means, such as suitable tracks and bars, well known, per se, to handle the metered and coated sheet 114 until the coating has solidified. Drying unit 121 can be augmented with associated apparatus comprising cooled or heated air flows, radiant or microwave heaters, suction or similar devices to facilitate the at least the partial solidification of the coating on sheet 121 within drying unit 121. Preferably, the coating is completely solidified upon exit from drying unit 121. Guide rolls 122, 123 are used to remove the now solidified coated sheet 114 from drying unit 121. Tension unit 124 includes a series of rollers 125, 126, 127, 128 to maintain tension on the solidified coated sheet 114 in preparation for rewinding the now coated sheet 114 into roll form 130. Roll form 130 may be further processed on site or shipped to manufacturers of corrugated and folding boxes.

Other methods of applying the coating of the invention, including spraying, falling curtain, etc., can be employed without departing from the sprit and scope of the invention.

Independent laboratory testing has confirmed that at dry weights of approximately 6.0 pounds of coating (13.2 kg) per one thousand square feet of substrate generates a barrier that is completely oil resistant when applying oleic fatty acids and oleic oils at temperatures above 160° F. (71° C.). The coating did not permit the oils to wick through the substrate to the opposite side thereof, even after 24 hours in an oven at 160° F. (71° C.). The same procedure was used on the uncoated (kraft) side of the substrate and each of the above formulas did not permit wicking upon reaching the coated surface. Coat weights of approximately 0.5 dry pounds per one thousand square feet and higher show measurable grease, oil and hot wax barrier values, as compared to the industry standard of 6.0 lb for typical coatings.

Testing in a paper mill had similar results. Specifically, a proper flow of the coating material was obtained and proper application was achieved between approximately 0.5 to approximately 8.0 dry pounds coating per thousand square feet substrate, with proper binding to the fibers. Wax pick tests confirmed the bonding. Proper folding and bending qualities were achieved on the coated substrate for ease of converting into packaging containers. Off-line coaters, such as described in U.S. Pat. No. 5,393,566 (discussed above) achieved the same superior running and application performance achieved in the paper mills. The same positive results were seen in the various testings of the coated substrate in all facets of required performance, most importantly superior resistance to hot grease, hot oil and heated wax.

Although described with reference to preferred embodiments, it should readily understood that various changes and/or modifications could be made to the invention without departing from the spirit thereof. In any event, the invention is only intended to be limited by the scope of the following claims.

I claim:

1. A grease, oil and wax resistant paper composition comprising:
   a cellulose-containing substrate in the form of individual fibers having a surface area and
   a water based mineral coating including:
      a filler material;
      a binder; and
      calcium carbonate, essentially free from surfactants.

2. The grease, oil and wax resistant paper composition of claim 1, wherein said paper composition has a GE brightness value greater than approximately 50.

3. The grease, oil and wax resistant paper composition of claim 1, wherein said paper composition has a GE brightness value less than approximately 90.

4. The grease, oil and wax resistant paper composition of claim 3, wherein said paper composition has a GE brightness value from approximately 50 to approximately 90.

5. The grease, oil and wax resistant paper composition of claim 4, wherein said paper composition has a GE brightness value from approximately 65 to approximately 78.

6. The grease, oil and wax resistant paper composition of claim 4, wherein said paper composition has a GE brightness value from approximately 78 to approximately 90.

7. A material formed from the grease, oil and wax resistant-paper composition of claim 1, wherein said material is selected from the group consisting of paper, paperboard, bagstock, ticketstock or liner board.

8. The grease, oil and wax resistant paper composition of claim 1, wherein said coating is essentially free from fluorocarbons and fluorotelomers.

9. The grease, oil and wax resistant paper composition of claim 1, wherein said filler material includes at least one of clay, sodium hexametaphosphate, $TiO_2$ and talc.

10. The grease, oil and wax resistant paper composition of claim 1, wherein said binder includes at least one of latex, PVC, PVA, acrylate, maleic acid and protein.

11. The grease, oil and wax resistant paper composition of claim 1, wherein said calcium carbonate has a particle size between approximately 0.6 and approximately 7.5 μm.

12. The grease, oil and wax resistant paper composition of claim 1, wherein said substrate is in the form of a box.

13. The grease, oil and wax resistant paper composition of claim 1, wherein said calcium carbonate is deagglomerated.

14. The grease, oil and wax resistant paper coating composition of claim 13, wherein said filler material includes at least one of clay, sodium hexametaphosphate, $TiO_2$ and talc.

15. A material formed from the grease, oil and wax resistant-paper composition of claim 1, wherein said material is selected from the group consisting of bagstock, ticketstock, linerboard, clothing, wallpaper, and laminated wood products.

16. A material formed from the grease, oil and wax resistant-paper composition of claim 1, wherein said fibers are selected from the group consisting of virgin fibers, recycled fibers and mixtures thereof.

17. A grease, oil and wax resistant paper composition comprising:
a cellulose-containing substrate having a surface area and a water based mineral coating including:
a filler material;
a binder; and
calcium carbonate, essentially free from surfactants,
a cellulose-containing substrate having a surface area and a water based mineral coating including:
a filler material;
a binder; and
calcium carbonate, essentially free from surfactants,
wherein the ratio of coating (dry lbs.) to 1000 square feet of surface area of said substrate is approximately 0.5 to approximately 0.6.

18. A grease, oil and wax resistant paper composition comprising:
a cellulose-containing substrate having a surface area and a water based mineral coating including:
a filler material;
a binder; and
calcium carbonate, essentially free from surfactants,
wherein the ratio of coating (dry lbs.) to 1000 square feet of surface area of said substrate is approximately 6.0 to approximately 8.0.

19. A water based grease, oil and wax resistant paper coating composition comprising:
water;
a filler material;
a binder;
and calcium carbonate, essentially free from surfactants.

20. The grease, oil and wax resistant paper coating composition of claim 19, wherein said coating is essentially free from fluorocarbons.

21. The grease, oil and wax resistant paper coating composition of claim 19, wherein said binder includes at least one of latex, PVC, PVA, acrylate, maleic acid or protein.

22. The grease, oil and wax resistant paper coating composition of claim 19, wherein said calcium carbonate has a particle size between approximately 0.6 and approximately 7.5 μm.

23. The grease, oil and wax resistant paper coating composition of claim 19, wherein said calcium carbonate is deagglomerated.

24. The grease, oil and wax resistant paper coating composition of claim 19, wherein said water comprises approximately 20% (by weight) of said composition.

25. The grease, oil and wax resistant paper coating composition of claim 19, wherein said binder comprises approximately 30% (by weight) of said composition.

26. The grease, oil and wax resistant paper coating composition of claim 19, wherein said calcium carbonate comprises between (by weight) approximately 20% to approximately 50% of said composition.

27. The grease, oil and wax resistant paper coating composition of claim 19, wherein said binder comprises protein.

28. The grease, and wax resistant paper coating composition of claim 27, wherein said binder further comprises latex.

* * * * *